(12) United States Patent
Van Spengen (10) Patent No.: US 8,339,090 B2
(45) Date of Patent: Dec. 25, 2012

(54) CURRENT CONTROL APPARATUS OPERABLE IN WET ENVIRONMENT

(75) Inventor: Dale A. Van Spengen, Smiths Falls (CA)

(73) Assignee: Sequence Controls Inc., Carleton Place, ON (CA)

( * ) Notice: Subject to any disclaimer, the term of this patent is extended or adjusted under 35 U.S.C. 154(b) by 283 days.

(21) Appl. No.: 12/876,554

(22) Filed: Sep. 7, 2010

(65) Prior Publication Data

US 2011/0057598 A1 Mar. 10, 2011

Related U.S. Application Data

(60) Provisional application No. 61/240,454, filed on Sep. 8, 2009.

(51) Int. Cl.
*H02P 27/04* (2006.01)
(52) U.S. Cl. ........ 318/503; 318/807; 318/801; 318/778; 318/438
(58) Field of Classification Search .................. 318/503, 318/801, 778, 807, 438
See application file for complete search history.

(56) References Cited

U.S. PATENT DOCUMENTS

| 6,181,583 B1 * | 1/2001 | Okui et al. ...................... 363/45 |
| 6,246,207 B1 | 6/2001 | VanSistine et al. |
| 7,466,098 B2 * | 12/2008 | Kwon et al. .................. 318/556 |

OTHER PUBLICATIONS

"Power Electronics and Motor Drives: Advances and Trends", Bimal K. Bose, pp. 168-169.

* cited by examiner

*Primary Examiner* — Walter Benson
*Assistant Examiner* — David Luo
(74) *Attorney, Agent, or Firm* — Marks & Clerk; Richard J. Mitchell (57) ABSTRACT

An apparatus operable in a wet environment includes a voltage doubler circuit including a pair of diodes, a pair of direct current switching elements connected between the respective diodes and a common point, a controller, an interface connected to the controller for receiving external status signals, and a switching arrangement responsive to signals from the controller to select the full power mode or a controlled power mode. In the controlled power mode, the switching elements are switched in a predetermined sequence such that only one of the switching elements conducts current during any one half cycle of the AC output voltage applied to the motor.

14 Claims, 10 Drawing Sheets

CURRENT CONTROL APPARATUS OPERABLE IN WET ENVIRONMENT

CROSS REFERENCE TO RELATED APPLICATIONS

This application claims the benefit under 35 USC 119(e) of prior U.S. application no. 61/240,454, the contents of which are herein incorporated by reference.

FIELD OF THE INVENTION

The present invention relates generally to an apparatus used to vary the speed of an electric motor and pump apparatus for use with bathing appliances such as hot tubs, swimming pools and hydromassage bath fixtures.

BACKGROUND OF THE INVENTION

Bathing appliances such as hot tubs, swimming pools and hydromassage bath fixtures often employ a water pumping means, generally comprising an induction (asynchronous) motor and direct-coupled centrifugal water pumping means. The pump operates at a single nominal speed which is directly related to the frequency of the A.C. mains supply voltage applied to the induction motor windings as well as the number of poles used in the motor design. Motor speed directly affects the pressure and flow characteristics of the pump; one speed thereby implying only one hydraulic setpoint for the given pumping system.

Bathing appliance manufacturers may wish to install pumps with high pressure and flow capacities to ensure satisfactory operation of the appliance during peak operating conditions, for example when several people are using a hot tub at one time. However, high hydraulic output may be a hindrance with a lower bather load or if gentle circulation of the water is required.

One prior art means of reducing the flow of circulation water involves manually operating restriction valves located at the water outlets of the bathing appliance. Restricting the flow of water in one area of the appliance increases the flow to an unoccupied area, providing a crude means of regulating bath water circulation.

Another known system incorporates the use of a controller and motor-operated water restriction valve, which is designed to be coupled to the pressure output port of the water circulation pump. Activation of the controller causes the operation of the motor-operated valve, thereby selectively increasing or decreasing the flow of water to the bathing appliance.

Although various forms of water restriction valves can be installed for reasonable cost, their limited scope of operation and inability to reduce motor/pump noise and operating costs is not seen as a suitable system for many bathing appliance manufacturers.

Yet another known system incorporates a water circulation pump having a universal or "brush-operated" electric motor coupled to a variable-voltage switching device means, allowing the motor to operate at a plurality of operating speeds.

Although the use of universal motors and variable-voltage switching means will directly control motor speed and pump hydraulic performance during low-speed operation, the are a number of limitations with this technology. Universal motors operate at very-high rotational speeds in order to develop sufficient torque to equal that of an equivalent induction motor. High-rotational speeds generate significant amounts of commutatator noise and reduce motor life due to brush wear. Increasing motor power level beyond a nominal level is also problematic for this technology.

A further prior art system employs the use of two or more pumps of various hydraulic performances. Hot tubs and swimming pools are filled with water and operated over periods of many months or years, requiring the use of water sanitation means and filtering. To lower the cost of operating units that include filtering systems, a secondary circulation pump that has a smaller hydraulic performance rating than the main water pump may be incorporated. Small circulator pumps allow the continuous "turn-over" of water through the filtration means, without incurring excessive operating costs related to the operation of the larger main pump.

Although having a range of pump sizes incorporated into the bathing appliance may allow optimisation of their use and reduce the operating costs of filtering the bathing water, this arrangement is costly to manufacture, nor does it improve the "bathing sensation" to the end user.

A further prior art system employs a device known as a Variable Frequency Drive (hereinafter referred to as "VFD") which converts the applied AC mains voltage to a variable voltage and frequency to adjust the rotational speed of the referred to induction motor and hence the speed of the connected water pump.

Bathing appliances that incorporate a VFD provide an improved bather experience by offering a nearly infinite range of hydraulic pump performance, reduced pump noise at low operating speeds and lower operating costs for water filtration and circulation that other prior art systems. Unfortunately, commercially available VFD systems have had a negligible impact on the market, despite their feature advantages, due to very high capital costs. Further, commercially available VFD systems are not designed to be operated within the confines of a bath system apparatus due to specialized electrical regulatory requirements. This restriction prevents the bather from being able to operate the VFD (adjust the water circulation rate) from the comfort of the bath due to the risk of electric shock hazard, unless an electrical isolation means is incorporated into the design, increasing costs further.

Accordingly, it is an object of the present invention to provide an improved means of varying the water pressure and flow in a bathing appliance such as hot tubs, swimming pools and hydromassage bath fixtures.

SUMMARY OF THE INVENTION

The present invention incorporates a unique variable speed drive apparatus, controller and electrically isolated user interface means to allow the bather to directly control the operation of the bath appliance. More particularly, the present invention relates to an apparatus for variable speed control of electric motors comprising an apparatus operable in a wet environment for controlling the flow of electrical current to an electrical load, adapted to be coupled to an AC source for supplying an AC signal, includes a voltage doubler circuit for rectifying and filtering an AC signal, direct current switches for modulating the rectified voltage, relay means for blocking or passing the flow of electrical current, a power supply and coupling means and controller means for operating the direct current switches and relays in a predefined sequence. Includes a user control and water temperature-sensing interface.

Embodiments of the present invention to incorporate a VFD using a half-bridge switching means and series connected relay to reduce cost and complexity of the semiconductor motor drive circuitry.

Embodiments of the incorporate a voltage doubler arrangement to supply direct current voltage to the VFD semiconductor switches. As will be presently disclosed, such an arrangement reduces circuit electrical resistance, lowers material costs of the electronic components and dramatically reduces the size of the semiconductor heat sink and packaging of the apparatus, compared with prior art VFD designs.

Embodiments of the incorporate the series connected relay to eliminate motor starting or inrush current through the semiconductor half-bridge switching means, thereby reducing stress and thermal losses on the VFD.

Embodiments of the a series connected relay between the source of AC mains voltage and the VFD apparatus, such an arrangement de-energizing the apparatus during idle periods and extending VFD component life.

According to one aspect of the present invention there is provided an apparatus operable in a wet environment for controlling the flow of electrical current to an electrical load, comprising: a pair of input terminals for connection to an AC mains supply; a pair of output terminals for connection to an electric motor and connected in a full power mode to said pair of input terminals; a voltage doubler circuit including a pair of diodes; a pair of direct current switching elements connected between said respective diodes and a common point; a controller; an interface connected to said controller for receiving external status signals; a switching arrangement responsive to signals from said controller to select said full power mode or a controlled power mode, and wherein in said controlled power mode said switching arrangement connects one of said output terminals to said common point so that AC output voltage is supplied to the electric motor through said switching elements; and wherein said controller is responsive to said external status signals to control said switching arrangement between the controlled mode and the full power mode, and in the controlled power mode to switch said switching elements in a predetermined sequence such that only one said direct current switching element conducts current during any one half cycle of AC output voltage applied to the electric motor.

According to another aspect of the invention, there is provided an apparatus operable in a wet environment for controlling the flow of electrical current to an electrical load, comprising: a controller; a voltage doubler circuit comprising a first and second rectifier diode coupled to respective first and second capacitors such that said first capacitor charges in a positive direction on a positive sinusoidal voltage and said second capacitor charges in a negative direction on a negative sinusoidal voltage, said voltage doubler circuit being adapted to be coupled to a first terminal of an electric motor and a source of AC mains supply voltage; a first direct current switching element having a first terminal coupled to said positively charged capacitor and a second terminal coupled to a first terminal of a first relay and a third terminal coupled to the controller, the switching device being operative in either a first state wherein significant current flow is prevented or a second state wherein current flow is substantially undisturbed; and a second direct current switching element having a first terminal coupled to the negatively charged capacitor and a second terminal coupled to said first terminal of said first relay and a third terminal coupled to the controller, the switching device being operative in either a first state wherein significant current flow is prevented or a second state wherein current flow is substantially undisturbed; said first relay being coupled to the controller and having a first terminal coupled to said direct current switching devices and a second terminal connected to a second terminal of said electric motor, and a third terminal for connection to the AC mains supply, said first relay being operable in a first state wherein electrical flow therethrough is substantially undisturbed between said first and second terminals, and is prevented between said second and third terminals, said first relay having a second state wherein significant electrical flow is prevented between said first and second terminals and substantially undisturbed between said second and third terminals; a second relay coupled to the controller and connected in series with a current limiting resistor and the voltage doubler circuit, wherein the second relay is operable in a first state wherein significant electrical flow is prevented or in a second state wherein electrical flow through the relay is substantially undisturbed, thereby charging the voltage doubler circuit; an interface for receiving user input signals to determine the operating status of the switching devices; a power supply adapted to be coupled to the AC mains supply for supplying an AC line potential reference, low voltage, direct current to the controller; and an isolation element for electrically isolating the user input signals from the AC mains supply, wherein the isolation element includes an optically isolated coupler for coupling user input signals to the controller; and wherein the controller is configured to receive switching device status signals from the interface for switching the relays and the direct current switching devices between their first and second states in a predetermined sequence.

In another aspect the invention provides a method of operating such an apparatus comprising:
(a) deactivating the relays and direct current switches;
(b) waiting for start command;
(c) setting the controller to activate the first and second relays;
(d) synchronizing the direct current switches to the AC mains supply;
(e) waiting for speed change command;
(f) deactivating the first relay;
(g) adjusting the voltage and frequency ratio of the direct current switch elements to a setpoint;
(h) waiting for stop command; and
(i) deactivating the relays and direct current switches.

Other advantages, objects and features of the present invention will be readily apparent to those skilled in the art from a review of the following detailed description of the preferred embodiment in conjunction with the accompanying drawings and claims.

BRIEF DESCRIPTION OF THE DRAWINGS

Exemplary embodiments of the invention will now be described with reference to the accompanying drawings, in which.

With respect to the above drawings, similar references are used in different Figures to denote similar components.

DETAILED DESCRIPTION OF EMBODIMENTS OF THE INVENTION

Figure 1:
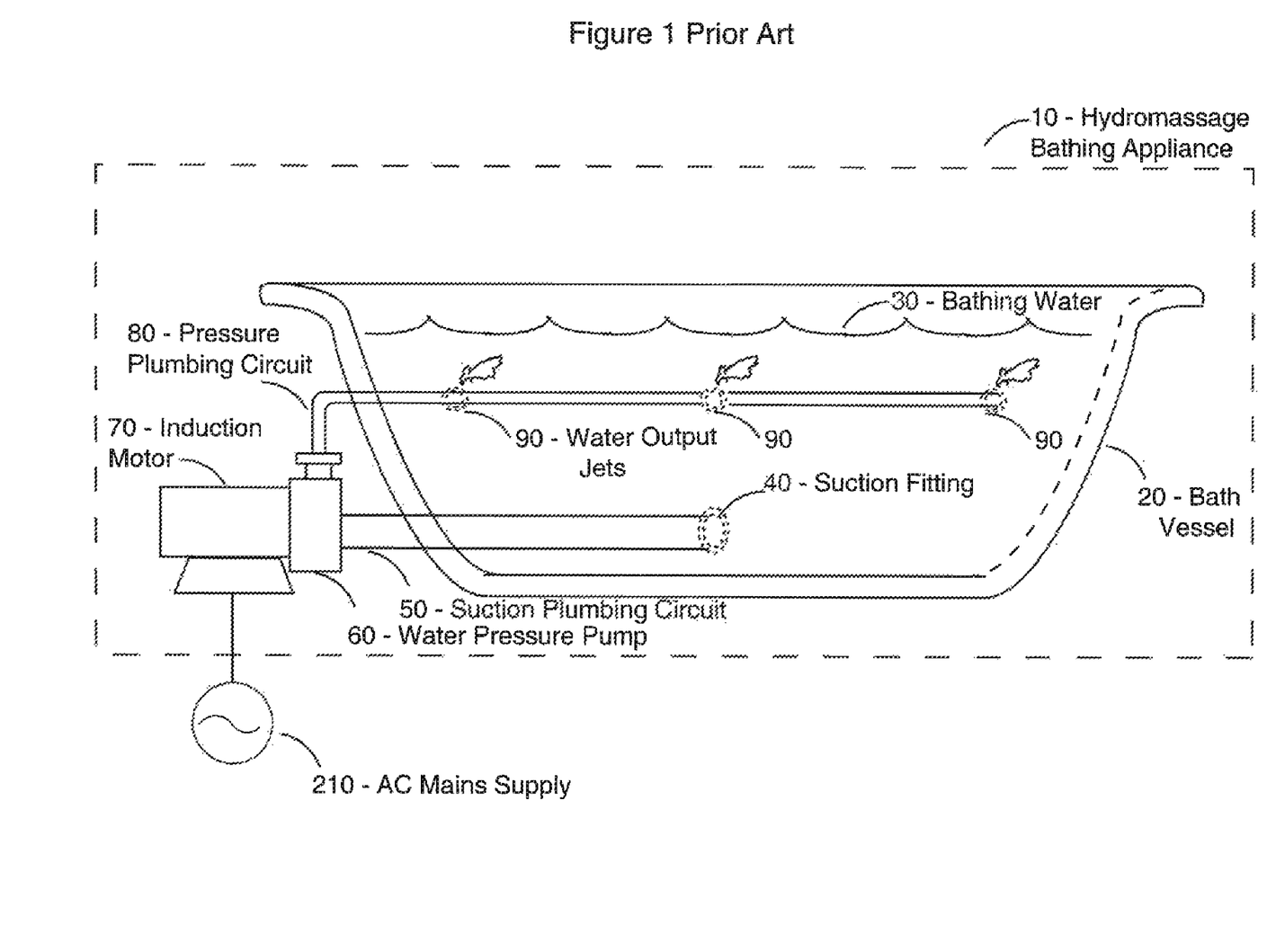
FIG. 1 is a schematic of the prior art showing a cut-away view of a typical hydromassage bathing appliance, detailing the installation of an induction motor and directly-coupled water pressure pump, suction and pressure plumbing circuits and water output jets.

Referring to FIG. 1, there is shown an embodiment of a typical prior art hydromassage-bathing appliance 10. A section view of the bathing vessel 20 is shown. Attached to the bath vessel 20 is a hydromassage pump comprising an induction motor 70, direct-coupled pump 60, shown with suction intake piping 50 and water inlet strainer 40, water pressure supply pipe 80 and water pressure jets 90.

The prior art embodiment shown in FIG. 1 is typical of many commercially manufactured baths, hot tubs and swimming pools, although heaters and non-pumping related devices, which are not pertinent to the description of the present invention, have been removed for clarity.

One drawback of this embodiment of plumbing configuration is the inability to adapt the hydraulic performance of the pumping system (pressure and flow hereinafter referred to as PF ratio) to the energy demand required by the bather experience or filtration needs. For example, a single-speed pump having an energy output of 1 kW may be acceptable for bath enjoyment but is an order of magnitude too great for water filtration requirements. Operating an oversized pump for filtration is inefficient, consuming far more energy than would be required by an optimised system.

Figure 2:
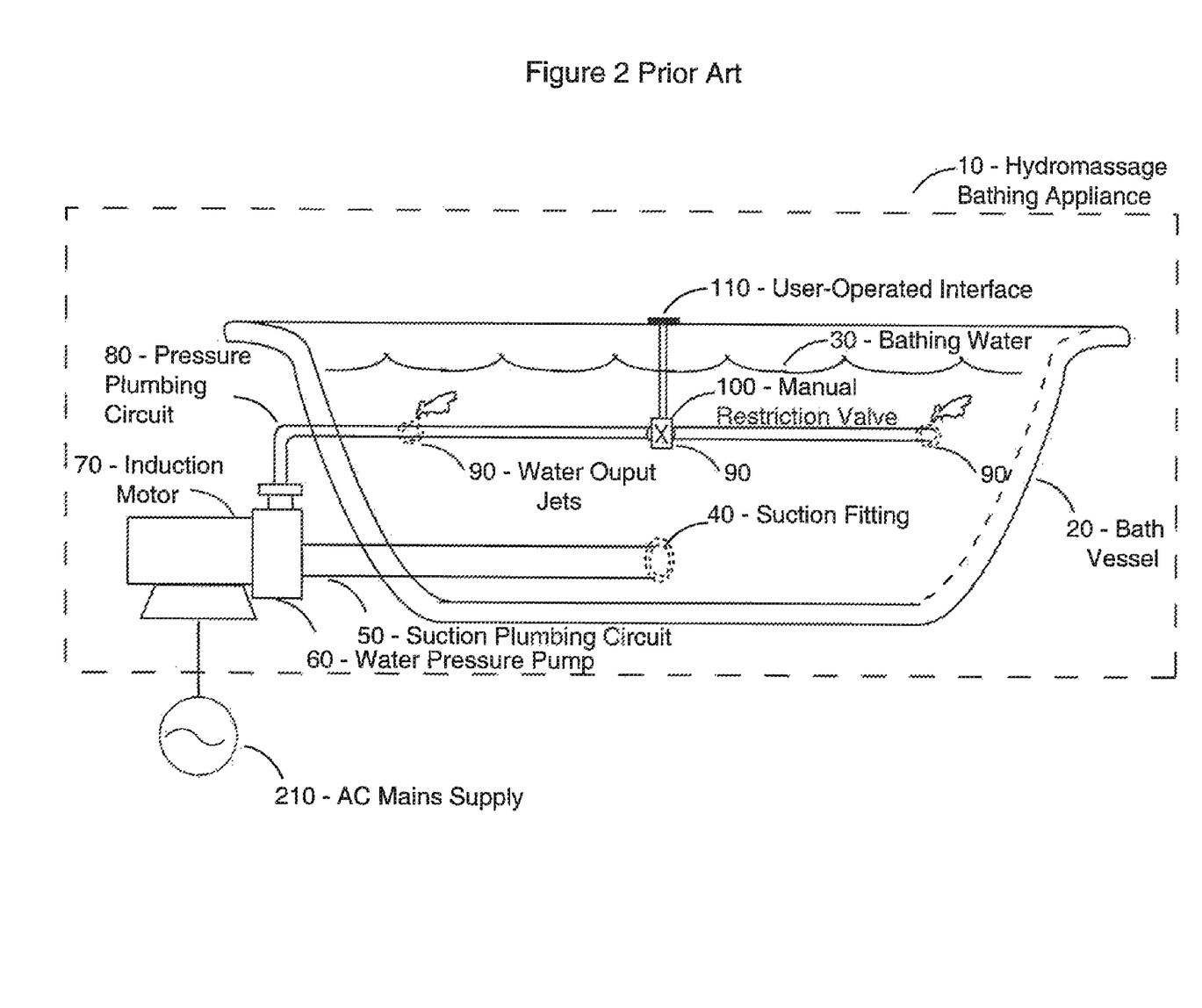
FIG. 2 is a schematic of the prior art showing a cut-away view of a typical hydromassage bathing appliance, detailing the installation of an induction motor and directly-coupled water pressure pump, suction and pressure plumbing circuits and water output jets which are equipped with manual restriction valves.

Referring to FIG. 2, there is shown one embodiment of the prior art, wherein a manually operated 110 water flow restriction valve 100 has been installed in the outlet of a water jet 90. This configuration allows the user to change the PF ratio, by restricting the water flow into the bathing vessel 20, thereby modifying the bathing experience felt by the user. Although this concept is both simple to install and inexpensive, it does not reduce pump energy consumption, nor reduce motor and pump noise when the restriction valve is activated.

Figure 3:
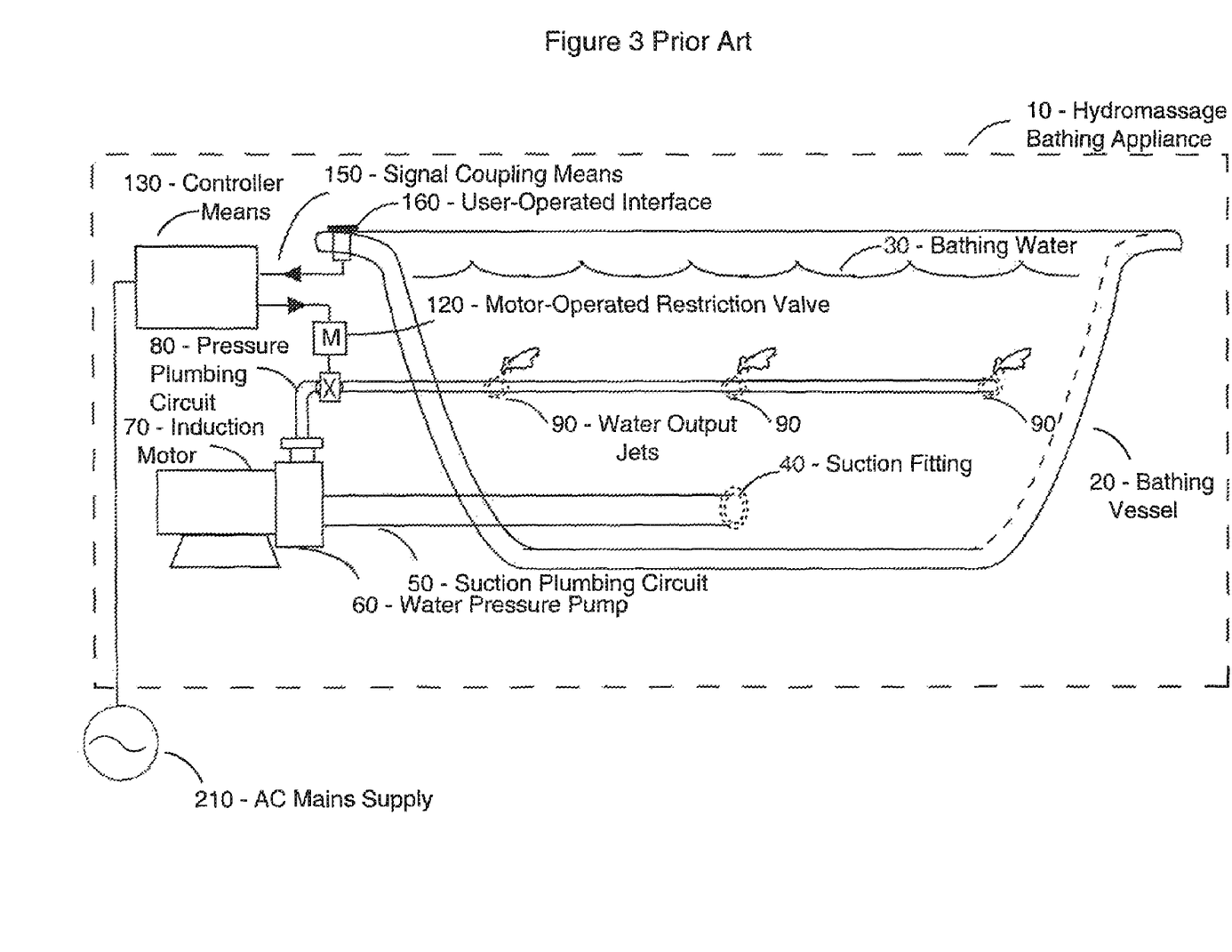
FIG. 3 is a schematic of the prior art showing a cut-away view of a typical hydromassage bathing appliance, detailing the installation of an induction motor and directly-coupled water pressure pump, suction and pressure plumbing circuits and water output jets. The water pressure pump is shown equipped with a motor-operated flow restriction valve, activated by a user-operated interface and controller.

Referring now to FIG. 3, an automated version of the water restriction valve discussed in FIG. 2 is shown. In this design, a motor-operated water restriction valve 120 is shown connected in the water discharge path 80 of pump 60. A user interface means 160 is connected via a communicating means 150 to a controller 130, which in turn is connected to operate motor-operated water restriction valve 120.

When the user activates the interface means 160, control signals are transmitted from the controller 130 to valve 120, causing said valve to open or close as directed. Although this configuration does not solve any of the problems noted in the description outlined for FIG. 2, several advanced features may be had, such as an undulating PF ratio caused by the continuous opening and closing of valve 120. This so-called "massage mode" provides an enhanced bathing experience and therefore found some commercial value in the marketplace.

Figure 4:
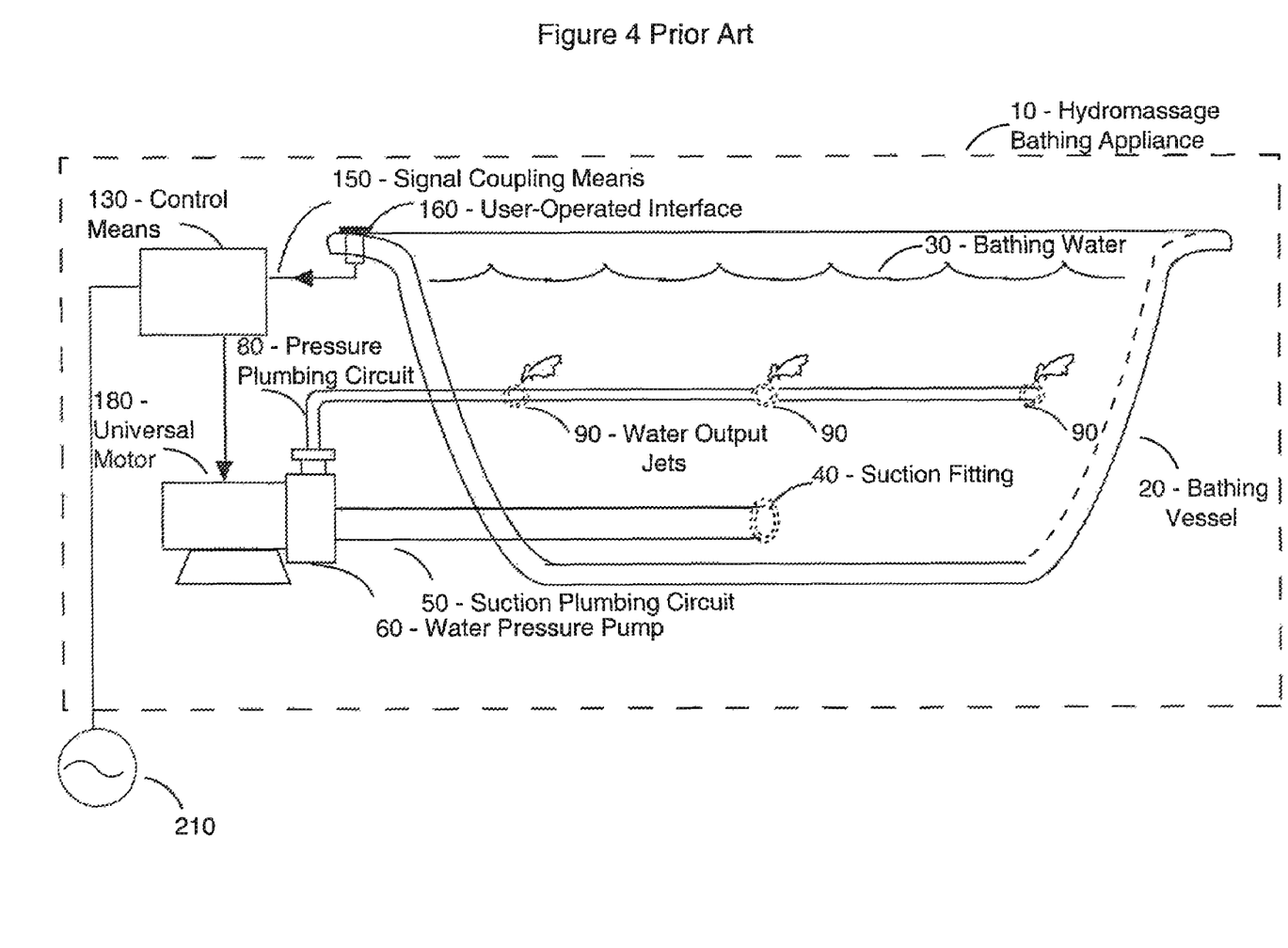
FIG. 4 is a schematic of the prior art showing a cut-away view of a typical hydromassage bathing appliance, detailing the installation of a universal or "brush-operated" motor and directly-coupled water pressure pump, suction and pressure plumbing circuits and water output jets. The bathing appliance is shown equipped with a variable-voltage controller connected to said universal motor, providing a plurality of selectable speeds, activated by a user-operated interface and controller.

Referring now to FIG. 4, a true variable speed pumping option is shown. In this design, a universal or "brush-type" motor 180 is attached to a water pressure pump 60, which is connected to the bath suction 40 and pressure system 90 as described previously. A user interface means 160 is connected via a communicating means 150 to a controller 130, which in turn is connected to operate said universal motor 180.

Controller 130 is designed to output a variable voltage signal 170 to universal motor 180, under commands received by the user interface 160 and communication means 150. Universal motors have the distinct feature of their rotational speed changing as a function of the voltage applied to their input windings. Varying the output voltage 170 is most commonly accomplished using a technique known as phase angle voltage modulation that a person skilled in the art will have knowledge regarding.

The use of a variable speed universal motor is a vast improvement over the prior art apparatus described in FIGS. 1, 2 and 3, as the PF ratio becomes a fully analogue level over the entire operating range of pump 60, allowing the user to precisely select the desired bathing experience. A further enhancement of this technology is that energy consumption of motor 180 is reduced as lower rotational speeds are selected.

Universal motors must operate at higher rotational speeds than similarly powered induction motors, which in turn increases overall motor and pump operating noise. Further, universal motors require brushes and commutation devices that are subject to wear, dramatically reducing their useful life compared to induction motor technology. Therefore, although universal pumps may be configured to operate in a true variable speed manner, high operating noise and low life spans must be considered before selecting this technology in the end use application.

Figure 5:
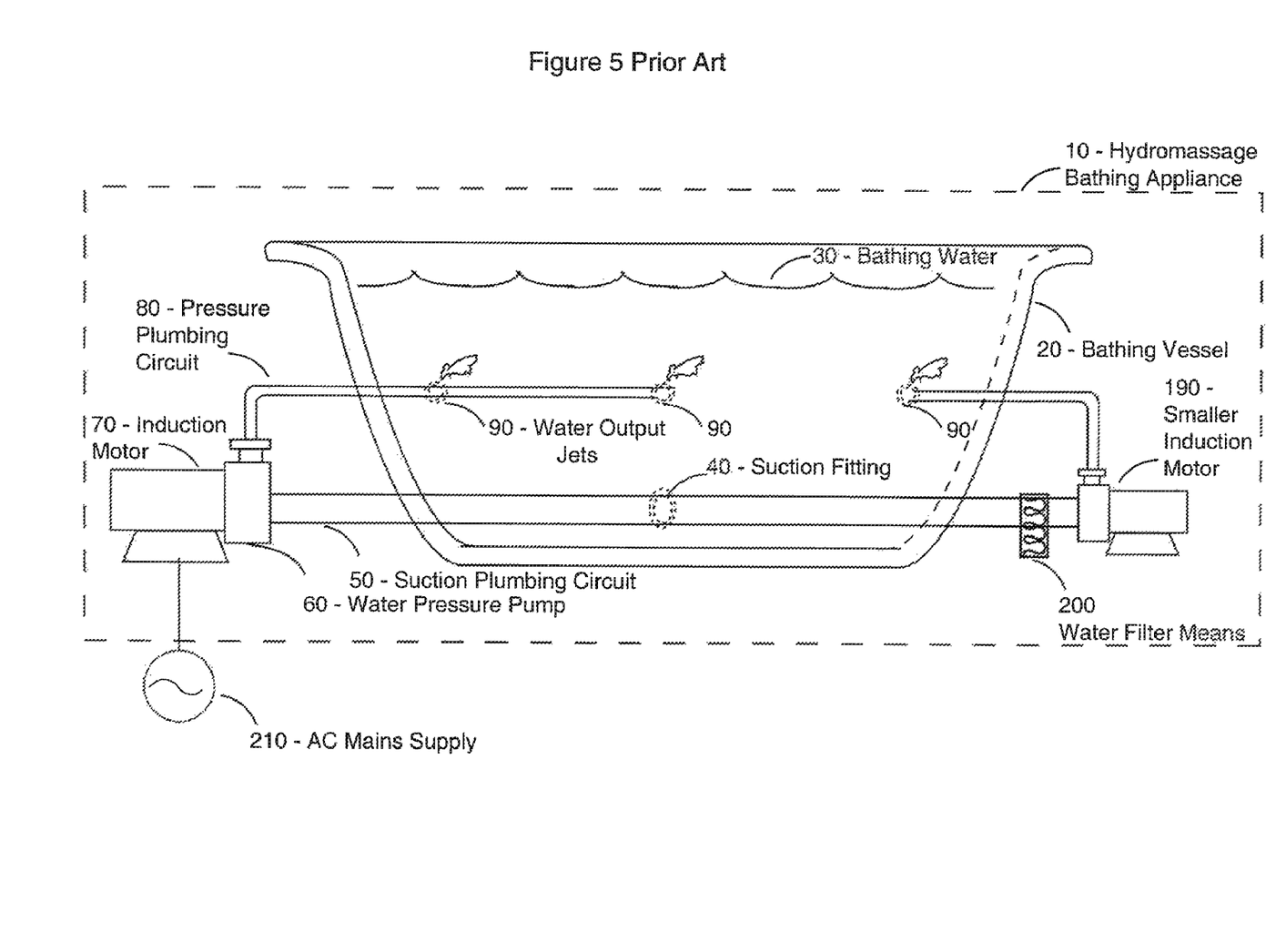
FIG. 5 is a schematic of the prior art showing a cut-away view of a typical hydromassage bathing appliance, detailing the installation of a first induction motor and directly-coupled water pressure pump, suction and pressure plumbing circuits and water output jets, and a second smaller induction motor and directly-coupled water pressure pump, suction and pressure plumbing, including water filter and output jets.

Referring now to FIG. 5, there is shown a prior art bathing appliance configured with two pumps connected within the bathing system 10. A first pump 190 is a small water circulation pump that is sized to provide optimum water flow for filtration, heating and other purposes. A common suction fitting 40 is plumbed to the one side of a water filter apparatus 200 which in turn supplies the intake of pump 190. The pressure side of pump 190 supplies pressurised, filtered water to jet 95.

A second, larger pump 60 is also connected to the bathing system 10, drawing water through common water suction fitting 40 and being discharged through water jets 90. This pump may be driven by either a single speed induction motor 70 or one having a plurality of speeds. Alternatively, a universal motor may also be utilised.

The advantage of the two-pump system allows the smaller pump 190 to be sized to efficiently perform the task of water filtration and circulation during, for example, a heating mode. The second larger pump 60 is then designed to perform the task of enhancing the bathing experience providing a high PF ratio as required by the bath user.

This system provides further enhancements over the prior art technologies described previously, but requires added hardware, plumbing, second pump and controls that increase system costs. Further, the issue of variable speed operation remains unsolved, as using a universal motor does not provide a satisfactory solution for the reasons described herein.

Figure 6:
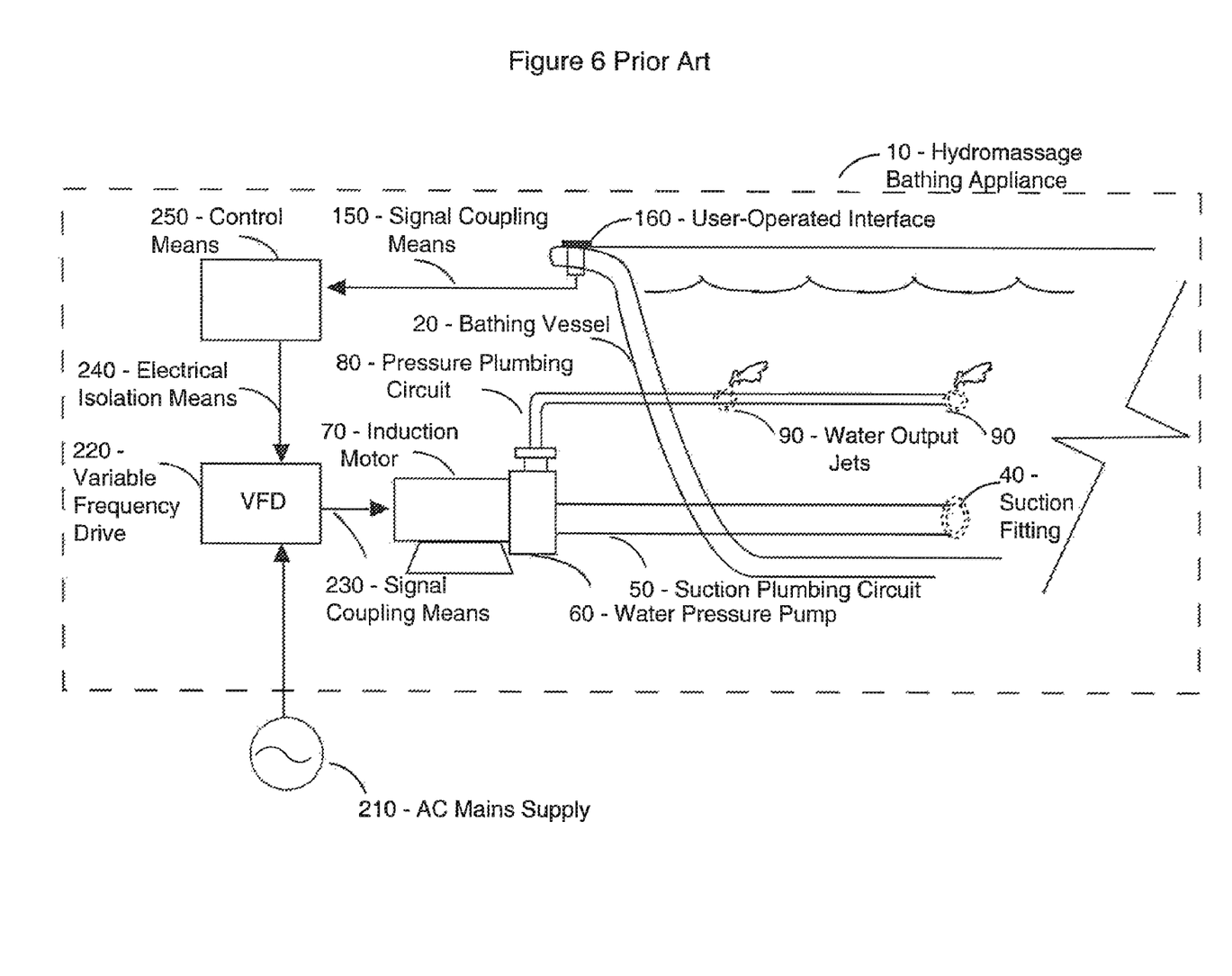
FIG. 6 is a schematic of the prior art showing a cut-away view of a typical hydromassage bathing appliance, detailing the installation of an induction motor and directly-coupled water pressure pump, suction and pressure plumbing circuits and water output jets. The water pressure pump is shown connected to a variable frequency drive (VFD) and electrical isolating means providing a plurality of selectable, speeds, activated by a user-operated interface and controller.

Referring now to FIG. 6, there is shown a further enhancement of the prior art bathing system 10 which details a partial section view of a bathing vessel 20 equipped with a water suction fitting 40 and pump intake piping 50. Water pressure pump 60 is designed to be coupled to an induction motor 70. The discharge of said water pressure pump 80 in turn supplies pressurized water to the water jets 90.

A user control 160 communicates user commands via interface 150 to controller 250. Signals generated by controller 250 are in turn communicated via interface 240 to a commercially available Variable Frequency Drive (hereinafter referred to as VFD) 220. A source of AC mains supply 210 is connected to VFD 220.

Using this arrangement, the bath user may establish a motor speed command, for example speed motor up, by pressing user control 160. Controller 250 and interface 150 are able to receive commands from the user control 160 via any number of means which provide electrical isolation between the bather and the electrical circuits comprising VFD 220 and controller 250. One such means is to utilise an optically isolated communication path using a device such as an optical coupler manufactured by Optek Technology, part number OP1155. The controller means also provides an industry standard interface 240 to communicate motor speed signals to the VFD, using for example a 4 to 20-milliamp current loop. Readers skilled in the art will understand the use of optical couplers and interface signals utilising a 4 to 20-milliamp current loop.

Using the apparatus described herein, the bath user can directly control the speed of induction motor 70 and pump 60, thereby varying the PF ratio as desired. Such an arrangement solves all of the technological problems described in the above review prior art apparatus, including the ability to vary motor 70 speed over a great range while maintaining optimum energy efficiency, provide long motor life due to induction motor technology as well as provide quiet operation. Although the prior art utilisation of VFD technology in bathing applications solves many technological problems related to earlier embodiments of bathing appliance, cost and complexity of controller 250 and VFD 220 limit the commercial viability of this apparatus.

Figure 7:
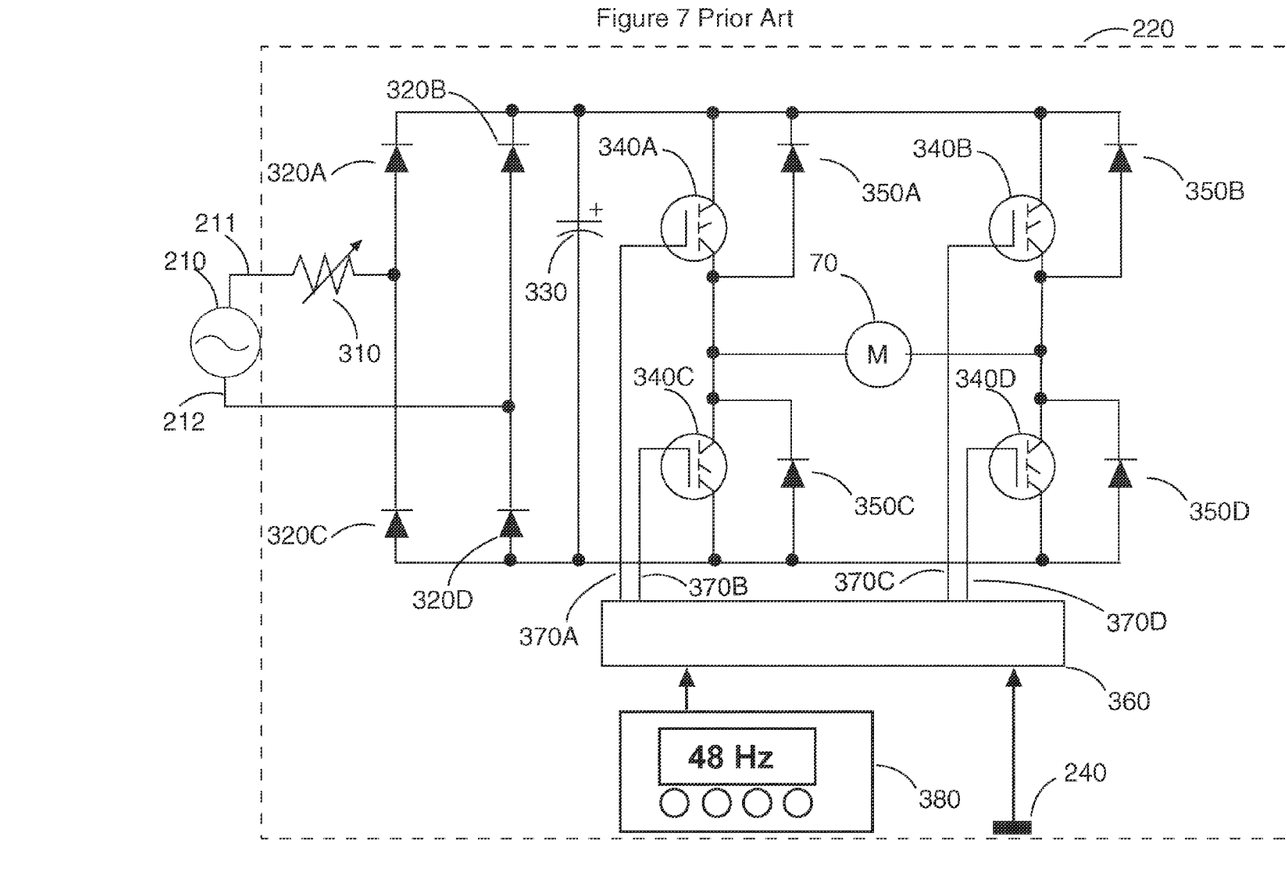
FIG. 7 is an electrical schematic of the prior art detailing a VFD connected to a source of AC mains voltage and induction motor.

Now, referring to FIG. 7, there is shown a schematic diagram of a typical VFD that is commercially available and may be adapted to operate a bathing appliance as described in FIG. 6. It should be understood that manufacturers of commercial VFDs are not aware of the end system application for their product, thus a number of optional features may be present which increases the cost of the final product.

A VFD system 220 is connected to a source of AC mains supply 210. A first output 211 from AC mains supply 210 is connected to a first terminal of a current inrush-limiting device 310. The second terminal of the inrush-limiting device is connected to the input of a full-wave diode rectifier bridge, comprising components 320A, B, C and D. A second output 212 from AC mains supply 210 is connected to the second input of said full-wave diode rectifier bridge.

Un-filtered (pulsating) direct current is presented on the output terminals of the said rectifier bridge and coupled to filter capacitor 330. Filtered direct current is then coupled to the input terminals of direct current switches 340A, B, C and D that comprises an "H-bridge" switching means. Fast reacting diodes 350A, B, C and D are coupled to said direct current switches, providing a high-speed voltage clamp designed to protect said direct current switches.

An induction motor 70 is connected to the junction of said direct current switches in such a manner that direct current may be made to flow back and forth through opposite terminals of said induction motor, simulating an alternating current voltage supply. For example if direct current switch 340A and D are activated current will flow through direct current switch 340A through a first terminal and stator windings of motor 70, through a second terminal of motor 70 and though direct current switch 340D. If direct current switch 340B and C are activated, the direction of current flow through motor 70 will be reversed.

Controller 360 is designed to be coupled to the said direct current switches and provide control signals 370A, B, C and D which sequence the direct current switches to generate a "simulated" alternating current of variable voltage and frequency to induction motor 70.

A reader skilled in the art will understand this embodiment of full wave rectifier diodes, capacitor, direct current switches and controller to generate an alternating current.

As discussed herein, an induction motor speed will vary as a function of the frequency of the voltage signal applied to its voltage input terminals. Simultaneously, an induction motor operating a centrifugal load such as a hydromassage bath pump, must maintain a constant voltage to frequency ratio (VF ratio). For example, a motor rated at 120 Volts and 60 Hertz would have a ratio of 120/60=2. As the VFD 220 is signalled to lower motor speed, for example to 30 Hertz, the applied voltage must also be lowered to 60 Volts in order to maintain the VF ratio at 2. A reader skilled in the art will understand that this combination of varying voltage and frequency can be accomplished using a technique known as pulse width modulation defined as part of the operating sequence of VFD 220.

A commercially manufactured VFD will often comprise a user programming controller 380 and interface means 240, such as a 4 to 20 milliamp current loop receiver. It shall be noted that coupling a bathing system controller 250 to said VFD 220 through interface 240 duplicates considerable amounts of electrical circuitry, component packaging, power supplies, etc. which increase overall system costs.

Further, commercial VFDs are designed to operate many types of induction motor in applications requiring constant or variable torque, which may utilise other control schemes than constant VF ratio. For example, a VFD may drive a motor, which is coupled, to a mechanical load having a very high starting torque and current requirement, which is not required in bathing applications. Accordingly, the additional (often expensive) design elements not required for bathing applications must be included in VFDs where the end system application is not known.

Figure 8:
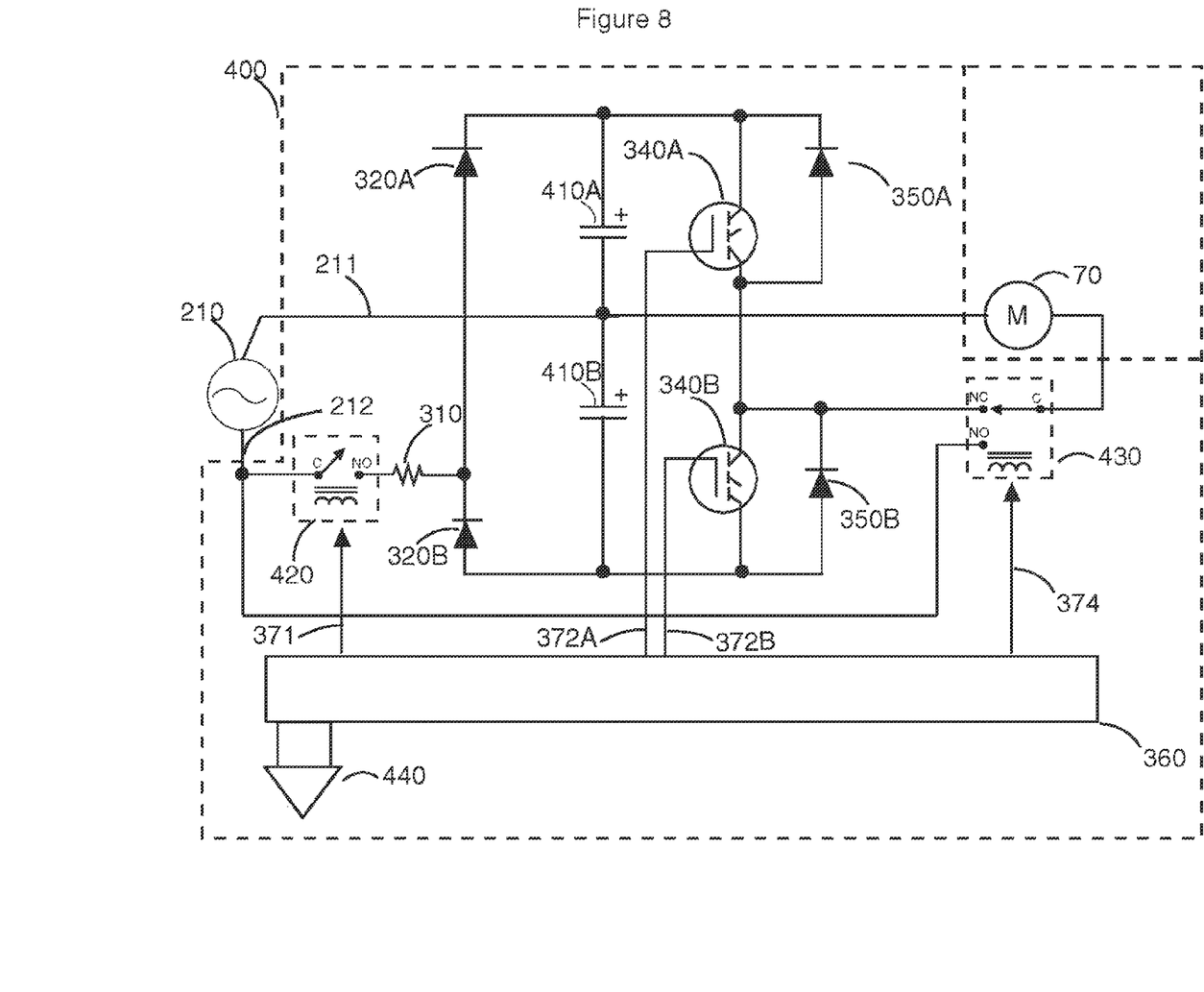
FIG. 8 is a partial electrical schematic detailing the present invention, connected to a source of AC mains voltage and induction motor. An electrically isolated interface bus is also shown.

Referring now to FIG. 8 an embodiment of the apparatus to control the speed of an induction motor is shown in accordance with the present invention. In this embodiment, an optimised VFD 400 and controller is presented wherein a source of AC mains 210 is coupled to a voltage-doubling circuit comprising half wave rectifier diode 320A and B and filter capacitor 410A and B. One terminal 211 of the source of AC mains 210 is connected to the "common" wiring point of filter capacitors 410A and B and a first terminal of relay 430. It should be noted that the direct coupling of one terminal of motor 70 directly to terminal 211 of AC mains supply 210 indicates that current switching through this terminal of induction motor 70 is not possible.

A second terminal 212 of AC mains supply 210 is series connected to a first relay 420, and current limiting device 310 before connecting to the input of said half-wave rectifier bridge. Relay 420 is designed to be normally open, such that the source of AC mains supply current cannot flow into the half wave rectifier bridge until controller 360 provides relay 420 with a control signal 371 to close.

When relay 420 is closed current will flow into said half wave rectifier bridge, in turn charging capacitors 410A and B on each alternating sinusoid of the AC mains voltage signal.

Assuming an AC mains supply 210 nominal voltage of 120 Volts Root Mean Square (RMS), the voltage-doubling circuit, capacitor 410A will be charged to a peak voltage of approximately positive 175 Volts and capacitor 410B will be charged to a peak voltage of approximately negative 175 Volts with respect to AC mains terminal 211 which form a common return path for the VFD circuit and induction motor 70.

Direct current switches 340A and B are designed to be coupled in a ½ bridge arrangement, with switch 340A able to supply positive voltage to the second terminal of induction motor 70, through normally closed second relay 430. Likewise, switch 340B supplies a negative voltage to the second terminal of induction motor 70, through normally closed relay 430.

Controller 360, which may be a microcontroller, is designed to be coupled to direct current switches 340A and B through optically coupled interfaces 372A and B, respectively. Optical coupling of controller 360 to direct current switches 340A and B eliminates the risk of hazardous electrical energy from being fed through controller 360 into the bath user controller 160.

Controller 360 provides the control signals 372A and B with the necessary ON and OFF commands to direct current switches 340A and B to produce a simulated alternating current signal of correct VF ratio to motor 70, using the aforementioned PWM method.

A second relay 430 is designed to be coupled in series with the common terminal connection of said direct current switches 340A and B, when said relay is in its de-energized state. When a signal from input bus 440 to controller 360 is received to start motor 70, controller 360 will activate relay 420 and 430.

Activating relay 420 will connect terminal 212 of AC mains supply 210 to inrush current limiter 310, thus rectifying the AC mains voltage and charging capacitors 410A and B. The VFD 400 is said to be in standby mode.

Activating relay 430 will connect terminal 212 of AC mains supply 210 to the second terminal of motor 70, causing it to start and accelerate to its nominal design rotational speed.

Simultaneously, controller 360 will begin to signal direct current switches 340A and B to transition between a low and high impedance state at a rate and phase angle that directly matches that of the AC mains 210 voltage signal. No current will flow through said direct current switches, because relay 430 is energized. This operation is known as synchronizing and its requirement will be presently explained.

When a user command to reduce motor speed is received at the input bus 440 or generated automatically by the controller 360, the controller will de-activate relay 430 "seamlessly" transferring voltage and current flow to motor 70 via direct current switches 340A and B.

Should a user command to increase motor speed to its nominal maximum speed be received at the input bus 440 or be generated automatically by the controller 360, the controller will reactivate relay 430 transferring voltage and current to motor 70 via AC mains 210 voltage signal, allowing the VFD 400 to revert to standby mode.

When a user command to stop motor 70 is received at input bus 440 or if one is generated automatically by controller 360, the controller will de-activate relay 420 and 430, stopping motor 70 and disconnecting VFD 400 from the source of AC mains supply 210.

Figure 9:
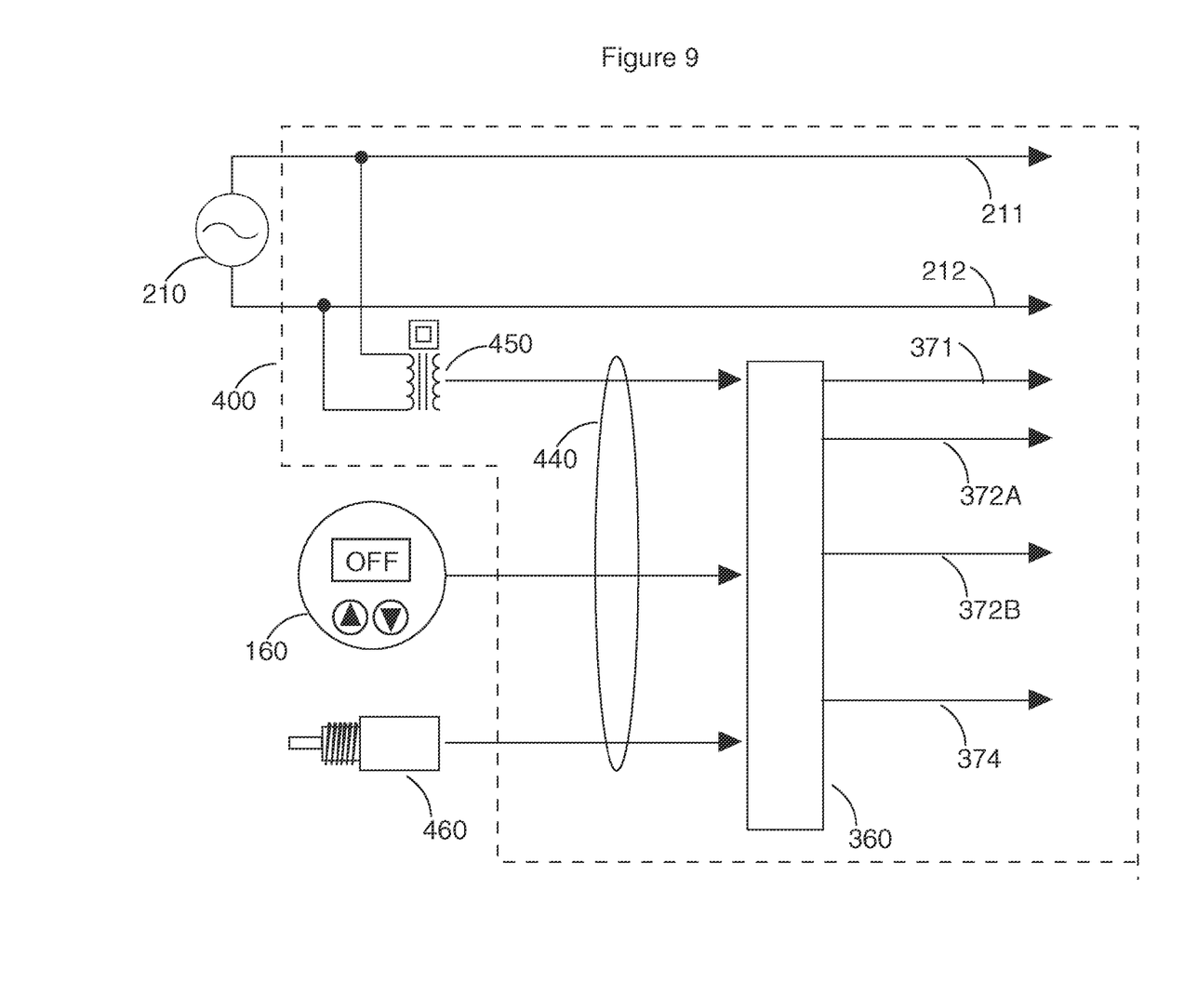
FIG. 9 is a partial electrical schematic detailing the present invention electrically isolated interface bus and controller means. Also shown is a source of AC mains voltage, low-voltage power supply and typical user-control devices.

Referring now to FIG. 9, with reference to FIG. 8, there is shown a schematic overview of the user control, power supply and interface means of the VFD 400. A source of AC mains supply 210 is shown with a first terminal 211 and second terminal 212 which are designed to be coupled to said motor drive components described herein, comprising first relay 420, inrush current limiter 310, rectifier diodes 320A and B, capacitors 410A and B, etc. of FIG. 8.

When controller 360 deactivates relay 420 and 430, AC mains voltage 210 is disconnected from above said motor drive components only. AC mains supply terminals 211 and 212 are also designed to be permanently coupled to double-insulated power supply transformer 450, which in turn provides source of safe, low-voltage to operate controller 360 and connected options via interface terminal 440. This may, for example, include a bath-mounted user-operating switch 160 or water temperature-sensing probe 460.

Connecting controller 360 to an electrically isolated supply of low-voltage power through transformer 450 and coupling direct current switching signals 372A and B through optical-isolating devices eliminates any risk of electric shock to the bather.

Utilising a voltage-doubler circuit, half-wave rectifier and ½ bridge direct current switches and integrated controller obviously reduces the cost of materials required to manufacture VFD 400. Included in the design are additional design improvements and enhancements over prior art VFDs, including:

1. Only one direct current switch is conducting current during any one-half cycle of the AC waveform applied to motor 70. The prior art VFD includes two direct current switches that will be activate during any one-half cycle. Using only one direct current switch reduces VFD conducting state electrical resistance and switching losses thereby reducing direct current switch heatsink area and cost.

2. Including relay 430 allows motor starting inrush current to be supplied directly from the AC mains supply 210 and not from direct current switches 340A and B. Motor 70 inrush current may be 5 to 10 times the rating running current, allowing said direct current switches to be smaller (have a lower current rating) than prior art "H-bridge" VFDs.

3. Synchronizing switching frequency of direct current switches 340A and B to AC mains supply voltage frequency and phase prior to de-activating relay 430 as described herein, reduces motor mechanical shaft "bumping" due to a transfer from one source of AC voltage frequency to another.

Figure 10:
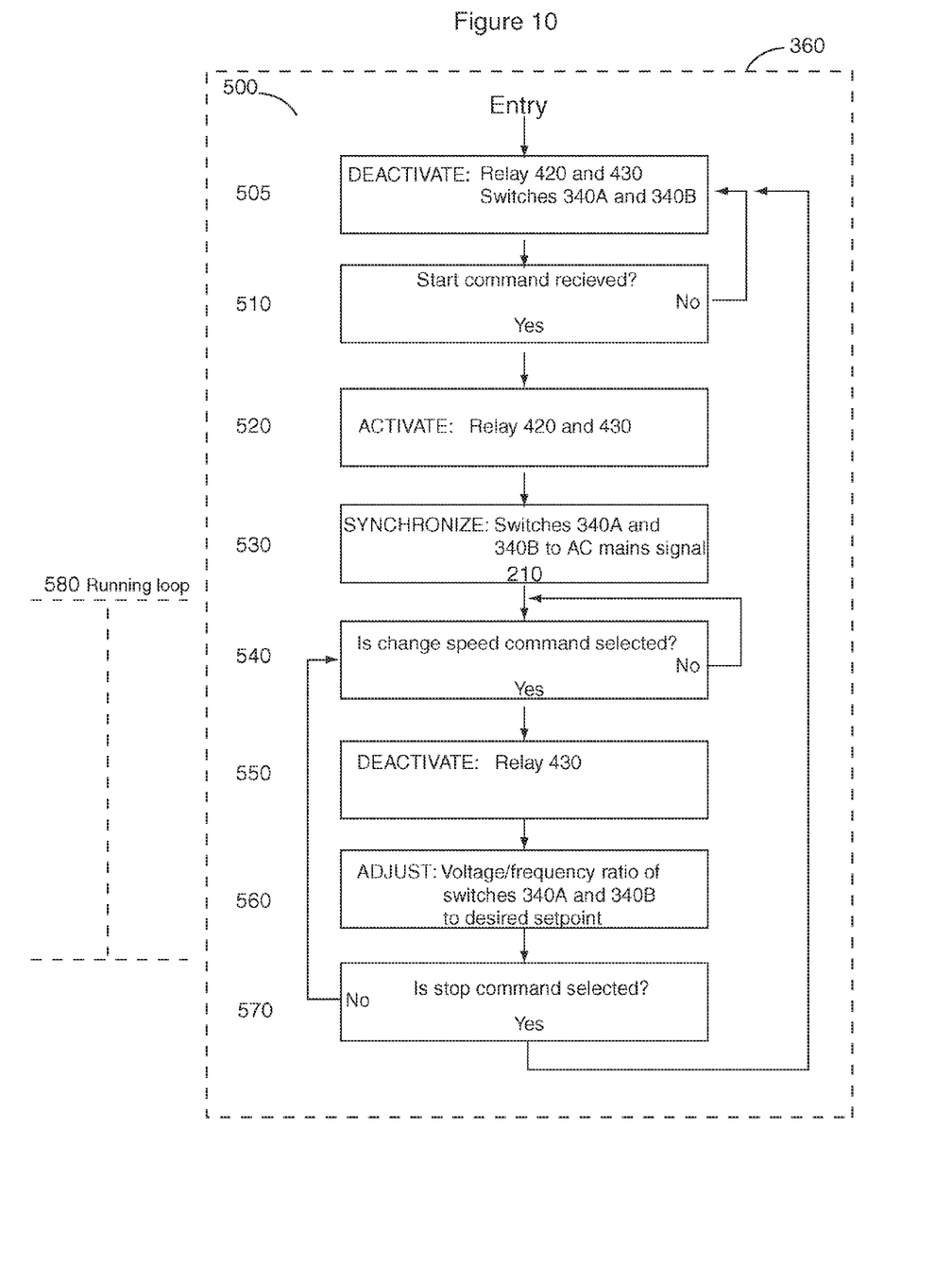
FIG. 10 is a flow chart illustrating the induction motor start, stop and variable speed operating sequence of the controller of the present invention.

Referring now to FIG. 10, there is shown a flow chart diagram of the operating mode sequence 500 of controller 360, of the present invention, based on the preferred embodiment schematic shown in FIGS. 8 and 9.

Upon entry to this flow chart, controller 360 will perform step DEACTIVATE RELAY 420 AND 430, SWITCHES 340A and 340B 505, placing the controller in a standby mode. The controller will advance to step START COMMAND RECEIVED? 510. The controller 360 will then loop to step 505 until start command 510 is received.

The controller will advance to step ACTIVATE RELAY 420 AND 430 (520) when a start command is received. This sequence will cause the induction motor 70 to be connected directly to the AC mains supply 210 causing said motor to start. VFD motor drive components will be energized and placed in standby mode.

The controller will advance to step SYNCHRONIZE SWITCHES 340A AND 340B TO AC MAINS SIGNAL 210 (530).

The controller will advance to step IS CHANGE SPEED COMMAND SELECTED? 540. The controller will then loop to step 530 until a speed change command is received.

The controller will advance to step DEACTIVATE RELAY 430 (550) when a change speed command is received. Deactivating relay 430 allows direct current switches 340A and B to provide a source of variable voltage and frequency to motor 70.

The controller will advance to step ADJUST VOLTAGE/FREQUENCY RATIO OF SWITCHES 340A and 340B TO DESIRED SETPPOINT. This step allows the speed of motor 70 to be changed as instructed.

The controller will then advance to step IS STOP COMMAND SELECTED? 570.

The control will advance to step 505 when a stop command is received. This step will de-activate relays 420 and 430 disconnecting the source of AC mains supply from said motor drive components and motor 70.

Controller 360 will then loop to step 540 until a further speed change or stop command is received, where the operating mode sequence 500 of controller 360 is repeated.

Numerous modifications, variations and adaptations may be made to the particular embodiments of the invention described above without departing from the scope of the invention, which is defined in the claims.

What is claimed is:

1. An apparatus operable in a wet environment for controlling the flow of electrical current to an electrical load, comprising:
   a pair of input terminals for connection to an AC mains supply;
   a pair of output terminals for connection to an electric motor and connected in a full power mode to said pair of input terminals;
   a voltage doubler circuit including a pair of diodes;
   a pair of direct current switching elements connected between said respective diodes and a common point;
   a controller;
   an interface connected to said controller for receiving external status signals;
   a switching arrangement responsive to signals from said controller to select said full power mode or a controlled power mode, and wherein in said controlled power mode said switching arrangement connects one of said output terminals to said common point so that AC output voltage is supplied to the electric motor through said switching elements; and
   wherein said controller is responsive to said external status signals to control said switching arrangement between the controlled power mode and the full power mode, and in the controlled power mode to switch said switching elements in a predetermined sequence such that only one said direct current switching element conducts current during any one half cycle of AC output voltage applied to the electric motor.

2. An apparatus as claimed in claim 1, wherein said interface is configured to receive user input signals.

3. An apparatus as claimed in claim 2, wherein said interface is further configured to receive temperature signals from a temperature sensor.

4. An apparatus as claimed in claim 1, further comprising an optical isolator for isolating the controller from the switching elements.

5. An apparatus as claimed in claim 1, wherein said switching element comprises a first relay for selectively connecting said voltage doubler circuit or said one output terminal to one of the input terminals and a second relay for selectively connecting said common point to said one of said output terminals.

6. An apparatus operable in a wet environment for controlling the flow of electrical current to an electrical load, comprising:
   a controller;
   a voltage doubler circuit comprising a first and second rectifier diode coupled to respective first and second capacitors such that said first capacitor charges in a positive direction on a positive sinusoidal voltage and said second capacitor charges in a negative direction on a negative sinusoidal voltage, said voltage doubler circuit being adapted to be coupled to a first terminal of an electric motor and a source of AC mains supply voltage;
   a first direct current switching element having a first terminal coupled to said positively charged capacitor and a second terminal coupled to a first terminal of a first relay and a third terminal coupled to the controller, the switching device being operative in either a first state wherein significant current flow is prevented or a second state wherein current flow is substantially undisturbed; and
   a second direct current switching element having a first terminal coupled to the negatively charged capacitor and a second terminal coupled to said first terminal of said first relay and a third terminal coupled to the controller, the switching device being operative in either a first state wherein significant current flow is prevented or a second state wherein current flow is substantially undisturbed;
   said first relay being coupled to the controller and having a first terminal coupled to said direct current switching devices and a second terminal connected to a second terminal of said electric motor, and a third terminal for connection to the AC mains supply, said first relay being operable in a first state wherein electrical flow therethrough is substantially undisturbed between said first and second terminals, and is prevented between said second and third terminals, said first relay having a second state wherein significant electrical flow is prevented between said first and second terminals and substantially undisturbed between said second and third terminals;
   a second relay coupled to the controller and connected in series with a current limiting resistor and the voltage doubler circuit, wherein the second relay is operable in a first state wherein significant electrical flow is prevented or in a second state wherein electrical flow through the relay is substantially undisturbed, thereby charging the voltage doubler circuit;

an interface for receiving user input signals to determine the operating status of the switching devices;

a power supply adapted to be coupled to the AC mains supply for supplying an AC line potential reference, low voltage, direct current to the controller; and an isolation element for electrically isolating the user input signals from the AC mains supply, wherein the isolation element includes an optically isolated coupler for coupling user input signals to the controller; and wherein the controller is configured to receive switching device status signals from the interface for switching the relays and the direct current switching devices between their first and second states in a predetermined sequence.

7. An apparatus as claimed in claim 6, wherein the interface is configured to receive temperature input signals from a temperature sensor for detecting and transmitting temperature signals.

8. An apparatus as claimed in claim 6, wherein the direct current switching elements are insulated gate bipolar transistors.

9. An apparatus as claimed in claim 6, wherein the direct current switching elements are field effect transistors.

10. An apparatus as claimed in claim 7, wherein the temperature sensor means is a thermistor.

11. An apparatus as claimed in claim 10, wherein the temperature sensor is a digital temperature transmitter.

12. An apparatus as claimed in claim 7, wherein the controller is a microcontroller.

13. An apparatus as claimed in claim 7, wherein the optically isolated coupler includes a light emitting diode transmitter arrangement.

14. A method for an apparatus operable in a wet environment for controlling the flow of electrical current to an electrical load, adapted to be coupled to an AC source for supplying an AC signal, comprising:
  a controller;
  a voltage doubler circuit comprising a first and second rectifier diode coupled to respective first and second capacitors such that said first capacitor charges in a positive direction on a positive sinusoidal voltage and said second capacitor charges in a negative direction on a negative sinusoidal voltage, said voltage doubler circuit being adapted to be coupled to a first terminal of an electric motor and a source of AC mains supply voltage;
  a first direct current switching element having a first terminal coupled to said positively charged capacitor and a second terminal coupled to a first terminal of a first relay and a third terminal coupled to the controller, the switching device being operative in either a first state wherein significant current flow is prevented or a second state wherein current flow is substantially undisturbed; and
  a second direct current switching element having a first terminal coupled to the negatively charged capacitor and a second terminal coupled to said first terminal of said first relay and a third terminal coupled to the controller, the switching device being operative in either a first state wherein significant current flow is prevented or a second state wherein current flow is substantially undisturbed;
  said first relay being coupled to the controller and having a first terminal coupled to said direct current switching devices and a second terminal connected to a second terminal of said electric motor, and a third terminal for connection to the AC mains supply, said first relay being operable in a first state wherein electrical flow therethrough is substantially undisturbed between said first and second terminals, and is prevented between said second and third terminals, said first relay having a second state wherein significant electrical flow is prevented between said first and second terminals and substantially undisturbed between said second and third terminals;
  a second relay coupled to the controller and connected in series with a current limiting resistor and the voltage doubler circuit, wherein the second relay is operable in a first state wherein significant electrical flow is prevented or in a second state wherein electrical flow through the relay is substantially undisturbed, thereby charging the voltage doubler circuit;
  an interface for receiving user input signals to determine the operating status of the switching devices;
  a power supply adapted to be coupled to the AC mains supply for supplying an AC line potential reference, low voltage, direct current to the controller; and
  an isolation element for electrically isolating the user input signals from the AC mains supply, wherein the isolation element includes an optically isolated coupler for coupling user input signals to the controller; and wherein the controller is configured to receive switching device status signals from the interface for switching the relays and the direct current switching devices between their first and second states in a predetermined sequence;
  said method comprising the steps of:
    (a) deactivating the relays and direct current switches;
    (b) waiting for start command;
    (c) setting the controller to activate the first and second relays;
    (d) synchronizing the direct current switches to the AC mains supply;
    (e) waiting for speed change command;
    (f) deactivating the first relay;
    (g) adjusting the voltage and frequency ratio of the direct current switch elements to a setpoint;
    (h) waiting for stop command; and
    (i) deactivating the relays and direct current switches.

* * * * *